United States Patent

[11] 3,556,459

| [72] | Inventor | Donald V. Summerville, Jr. |
| --- | --- | --- |
| | | Buffalo, N.Y. |
| [21] | Appl. No. | 836,450 |
| [22] | Filed | June 25, 1969 |
| [45] | Patented | Jan. 19, 1971 |
| [73] | Assignee | Gardco Industries, Inc. |
| | | Geneva, N.Y. |
| | | a corporation of New York |
| | | Continuation-in-part of application Ser. No. 603,240, Dec. 20, 1966, Patent No. 3,480,243. |

[54] FRAME MOUNTING BRACKET
6 Claims, 12 Drawing Figs.

[52] U.S. Cl. .................................................. 248/497,
248/216, 248/300
[51] Int. Cl. ........................................................ A47g 1/16
[50] Field of Search ............................................. 248/495,
496, 497, 498, 477, 476, 475, 300, 216

[56] References Cited
UNITED STATES PATENTS

| 814,163 | 3/1906 | Pursell.......................... | 248/498 |
| --- | --- | --- | --- |
| 1,600,919 | 9/1926 | Baalsrud....................... | 248/496 |
| 2,483,114 | 9/1949 | Schoor et al................... | 248/498X |

*Primary Examiner*—Roy D. Frazier
*Assistant Examiner*—J. Franklin Foss
*Attorney*—Sommer, Weber & Gastel ABSTRACT: A bracket for mounting a picture frame or the like on a wall including a substantially horizontal portion and a plurality of staggered prongs extending upwardly therefrom for insertion into the underside of the upper member of a frame, a combined offsetting and guiding portion connected to the horizontal portion, and a vertical portion connected to the offsetting portion and having a serrated edge thereon proximate an opening for receiving a nail or hook. A picture hook for mounting a wire attached to the back of a frame comprising a body member, a central elevated projection and a pair of spaced lower projections equally spaced on opposite sides of the central projection, said projections having sloping edges which merge into the body member to wedge a line between said edges and said body member, and pressure-sensitive adhesive on the rear of the hook for mounting the hook on a wall. A bracket arrangement for mounting an object on a wall including a pair of brackets with the first bracket including a body portion having pressure-sensitive adhesive on one surface for attachment to a wall and a keyway in the opposite surface, the second bracket having a pressure-sensitive adhesive on one surface for attachment to the body to be hung and a keyway in its opposite surface and a key for insertion into the two keyways for mounting the first bracket on the second bracket.

PATENTED JAN 19 1971 3,556,459
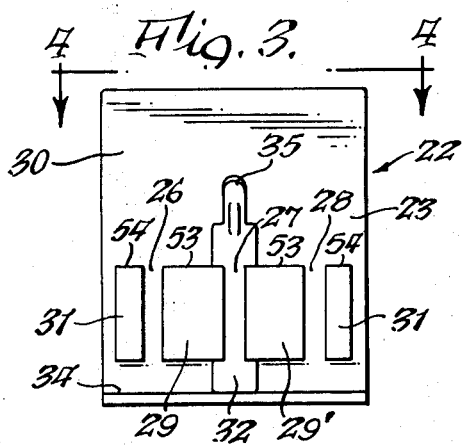
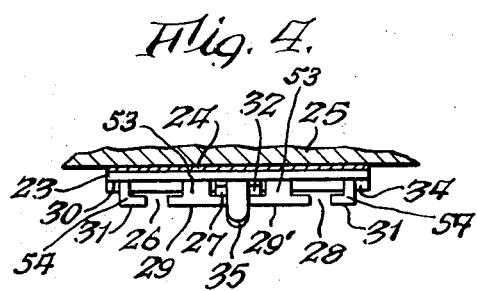
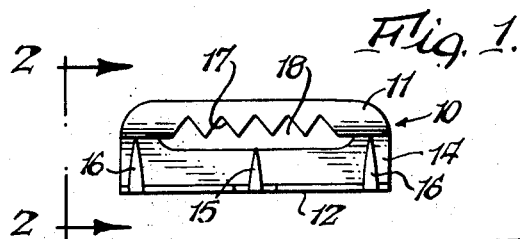
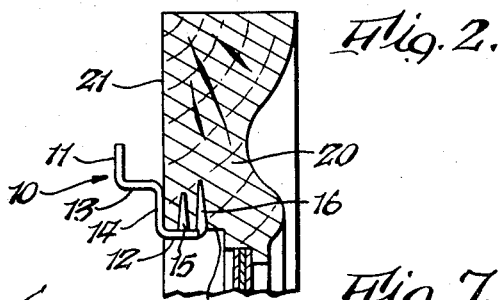
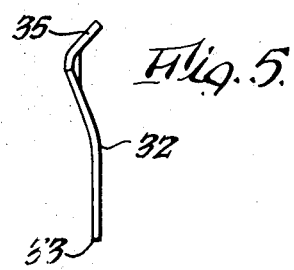
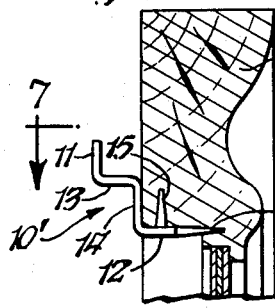
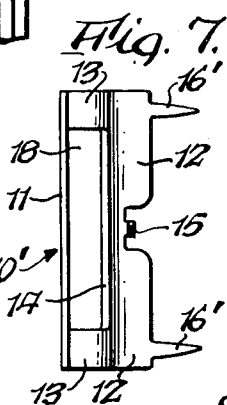
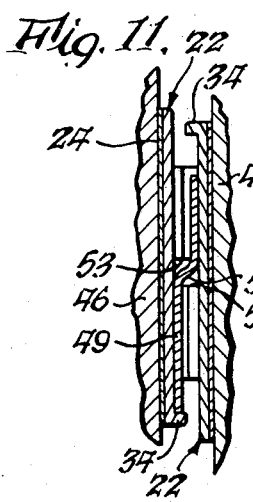
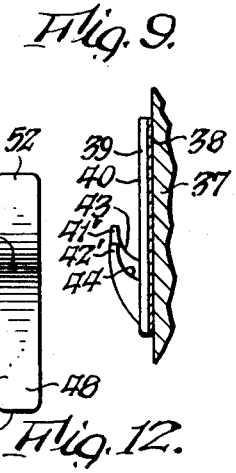
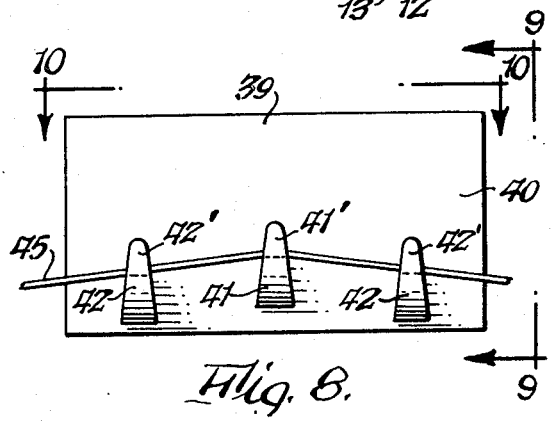
INVENTOR.
Donald V. Summerville, Jr.
BY
Joseph P. Gastel
ATTORNEY

FRAME MOUNTING BRACKET

This application is a continuation-in-part of application Ser. No. 603,240 filed Dec. 20, 1966 now U.S. Pat. No. 3,480,243.

The present invention relates to in improved bracket for mounting picture frames, mirrors, or the like, on a wall.

In the past attempts have been made to simplify the task of hanging picture frames and the like. As a result of these attempts various types of brackets have been developed which could be pressed into a portion of the picture frame and thereafter mounted on a wall, thereby obviating the need for wires on the frame. However, these prior brackets were either too flimsy to provide dependable operation, or they were fabricated in an expensive manner, or they were difficult to use. It is with an improved picture hanging bracket which overcomes the foregoing shortcomings that the present invention is concerned.

It is accordingly one object of the present invention to provide an improved frame mounting bracket which can be installed on a frame without tools and which is automatically positioned in the proper location on the frame. A related object is to provide a bracket which will not become loose in use.

Another object of the present invention is to provide an improved frame mounting bracket which can be fabricated from sheet metal by a simple punching and bending operation.

A further object of this present invention is to provide an improved frame mounting bracket which can mount the frame on a wall in an extremely simple and efficient manner because the portion thereof which is mounted on a hook is offset from the portion which is attached to the frame so as to provide the necessary clearance during installation.

Yet another object of the present invention is to provide an improved picture hook for receiving a wire on the back of a picture frame so that the wire is held against slippage, thereby maintaining the picture in its desired mounted position. A related object of the present invention is to provide an improved picture hook which acts as a guage to level the picture mounted thereon.

A further object of the present invention is to provide an improved mounting arrangement for mounting objects which do not have holes, wires or other conventional fastening devices associated therewith in an extremely simple and expedient manner. Other objects and attendant advantages of the present invention will readily be perceived hereafter.

The improved frame mounting bracket of the present invention comprises a substantially horizontal portion having a plurality of staggered prongs extending upwardly therefrom for insertion into the underside of the upper member of a frame, a combined offsetting and guiding portion connected to the horizontal portion, and a vertical portion connected to the combined offsetting and guiding portion and having a serrated edge proximate an opening therein for resting on a nail or a hook. The combined offsetting and guiding portion aids in the proper location of the bracket on the frame and offsets the vertical portion from the frame to provide sufficient clearance to facilitate the hanging of the frame on a hook on the wall. The fact that the prongs are offset from each other causes the bracket to be mounted firmly on the frame member against loosening.

The present invention also is directed to a picture hook for mounting a wire attached to the back of the frame comprising a body member, a central elevated projection and a pair of spaced lower projections equally spaced on opposite sides of the central projection, said projections having sloping edges which merge into the body member to wedge a line between said edges and said body member to prevent slippage, and pressure-sensitive adhesive on the rear of the hook for mounting the hook on a wall. The above hook arrangement functions as a guage for leveling a picture frame because the frame will be level when the wire rests on all the projections.

The present invention also is directed to a bracket arrangement for mounting an object on the wall which includes a pair of brackets with the first bracket including a body portion having pressure-sensitive adhesive on one surface for attachment to a wall, and a keyway in its opposite surface, a second bracket having a pressure-sensitive adhesive surface for attachment to the object to be hung and a keyway in its opposite surface, and a key for insertion into the two keyways for mounting the first bracket on the second bracket to thereby suspend the object from the wall.

The present invention will be more fully understood when the following portions of the specification are read in conjunction with the drawings wherein:

FIG. 1 is a front elevational view of a preferred embodiment of the improved bracket of the present invention;

FIG. 2 is a view taken substantially along line 2–2 of FIG. 1 and showing the bracket engaging a horizontal member of a frame;

FIG. 3 is a front elevational view of a bracket base which is adapted to be attached to a wall for supporting the bracket of the present invention;

FIG. 4 is a view taken substantially in the direction of arrows 4–4 of FIG. 1;

FIG. 5 is a side elevational view of the projection which is carried by the bracket base of FIGS. 3 and 4;

FIG. 6 is an end elevational view similar to FIG. 2 but showing a modified embodiment of the bracket of the present invention;

FIG. 7 is a view taken substantially along line 7–7 of FIG. 6 with the frame omitted;

FIG. 8 is a front elevational view of a hook used for supporting a wire on the back of a frame;

FIG. 9 is a view taken substantially along line 9–9 of FIG. 8;

FIG. 10 is a view taken substantially along line 10–10 of FIG. 8;

FIG. 11 is a cross-sectional side elevational view showing the manner in which the bracket bases of FIG. 3 may be used in combination to hang plates or other objects which do not have an aperture therein; and FIG. 12 is a front elevational view of the clip which is utilized in the combination of FIG. 11.

The improved frame mounting bracket 10, which is fabricated of metal by a simple stamping and bending operation, includes a generally vertical portion 11, a generally horizontal portion 12 and a combined offsetting and guiding portion including spaced horizontal portions 13 and a vertical portion 14. Extending upwardly from horizontal portion 12 are a central prong 15 and a pair of end prongs 16 which are staggered from said central prong, that is, they are further away from vertical wall 14 than prong 15. The vertical portion 11 includes serrated portion 17 which is adjacent cutout 18.

In order to mount bracket 10 on a picture frame, or the like, it is merely necessary to manually press prongs 15 and 16 into the lower edge 19 of frame member 20 (FIG. 2). The vertical wall portion 14 acts a guide to maintain proper alignment between the bracket and the frame member. Furthermore, since prongs 15 and 16 are staggered and since wall portion 14 abuts the rear surface 21 of member 20 the bracket 10 is firmly locked against rocking movement which could loosen the bracket.

After bracket 10 has been mounted on horizontal frame member 20, the vertical wall portion 11 is mounted on a small projection such as a nail, hook or the like driven into a wall. The nail or hook extends through opening 18 and provides a rest for the serrated portion. Portions 13 of the bracket are offsetting portions in that they offset the frame member 20 from the wall to provide a clearance to facilitate the mounting of portion 11 on a hook or the like. Member 20 is the top member of a conventional picture frame, or mirror frame, or the like.

While any kind of hook or nail can be used to support the bracket 10, as noted above, a preferable bracket base 22, which is fabricated of molded plastic material, is shown in FIGS. 3 and 4. Base 22 includes a body portion 23 having pressure-sensitive adhesive 24 which covers the entire rear surface for securing mounting base 22 to the wall 25. A plurality of keyways or slots 26, 27 and 28 are formed on the front face 30 of the mounting base. Keyway or center slot 27 is formed by two central T-shaped members 29 and 29' which protrude from the front surface 30 of base 22. The end slots 26 and 28 are formed by a T-member 31 and either one of L-shaped members 29 or 29'. An elongated insert 32 made of springy metal is received in central slot 27 and includes a body portion which is held within the slot in the nature of a key and a bottom 33 which rests on ledge 34 which extends outwardly from surface 30. The top of member 32 is formed into a narrow projection 35 on which serrated portion 17 rests. It will be appreciated that if the bracket 10 is not exactly centered on frame member 20, projection 35 may be inserted to either side of the central portion of the serration to balance the frame properly. Insert 32 is held in slot 27 by friction because it bears against the surface 30 and members 29–29' because of its springiness.

In FIGS. 6 and 7 a modified embodiment 10' of the bracket 10 of FIGS. 1 and 2 is disclosed. This embodiment is identical in most respects to the embodiment of FIGS. 1 and 2 and like numerals represent like parts. The only difference is that prongs 16' extend horizontally from horizontal portion 12 rather than vertically as do prongs 16 of bracket 10. As can be visualized from FIG. 6, bracket 10' is installed on the frame by first pushing the points of prongs 16' into frame member 20 and thereafter pushing prongs 15 upwardly into member 20. This provides a positive locking engagement with the frame member 20. In order to effect the foregoing, prongs 16' have to be bent during installation.

In FIGS. 8, 9 and 10 a molded plastic picture hook is shown for mounting on a wall 37 by means of a pressure-sensitive adhesive backing 38 which covers the entire rear surface of body portion 39. A plurality of hooklike members or projections extend outwardly from face 40 of the bracket and these projections include a central projection 41 which is elevated above and equally spaced from outer projections 42. Each of these projections has the same configuration, which is essentially in the nature of a horn. Surfaces 43 and 44 on projections 41 and 42, respectively, extend at an angle to surface 40 so as to wedge line 45 tightly between said edges and said surface when this line is mounted thereon. This line may be a wire or a string which has its opposite ends attached to the opposite side portions of a frame, or the like, in the conventional manner. It will be appreciated that when line 45 touches the surfaces 43 on central hook 41 and the outer surfaces 44 on outer hooks 42, the picture supported by line 45 will be level. Stated another way, unless there is the foregoing contact, the picture is not level. Thus the orientation of hooks 41 and 42 functions as a gauge for leveling a frame. As can be seen from FIGS. 8–10, the bases of projections 41—42 are in the nature of a hollow shell or horn, with the upper portions formed into tabs 41' and 42' which are shaped to fit a keyhole type of slot usually found in plaques or the like. Tabs 41' and 42' can also be used to support picture hanging brackets 22.

In FIGS. 11 and 12 a still further type of mounting construction is shown which includes a pair of bases 22 which are identical to those shown in FIGS. 3 and 4 except for the insert 32. FIG. 11 is taken along the centerline of slot 27, FIG. 3. One bracket 22 is attached to a wall 46 by its pressure-sensitive adhesive 24. The other bracket 22 is attached to the back of a plate, mirror or any other flat surface 47 by means of its pressure-sensitive adhesive 24. The base mounted on the wall has its ledge 34 at the bottom whereas the other base has its ledge 34 at the top. A key 48 has its lower portion 49 inserted in central slot 27 of the bracket base mounted on the wall and the lower edge 50 of key 48 rests on ledge 34. The central portion of key 48 has a double bend 51 therein which merges into upper key portion 52 which is received in central slot 27 of bracket base 22 which is attached to the object 47 to be mounted on the wall 46. Stated another way, bracket bases 22 are mounted with the faces 30 of each facing each other, but with ledges 34 on opposite sides of the assembly, and with the T-members 29 and 29' of one bracket base in alignment with the T-members 29' and 29, respectively, of the other. If desired, portions of the members 29 and 29' may be cut away to accommodate double bend 51 and thus cause the upper edges 53 and 54 of the key-shaped members 29–29' and L-shaped members 31, respectively, to rest on the corresponding edges of the inverted bracket base to provide a firm mounting of one bracket base on the other bracket base. This construction permits easy mounting of mirrors or the like on a wall. The object which is mounted can be shifted sideways, if desired, without removing the brackets 22 from either the wall or the object. This is achieved by inserting key 48 in any keyway 26, 27 or 28 of one of the brackets 22 and mounting any of the other keyways of the other bracket on the key.

I claim:

1. A frame mounting bracket comprising a first portion, means on said first portion for attaching said bracket to a wall, a second portion connected to said first portion for underlying a horizontal edge of a horizontal member of a frame, a plurality of prongs extending from said second portion and located at different distances from said first portion for penetrating said horizontal member at staggered locations to securely lock said bracket to said horizontal member against relative rocking movement, and an offsetting portion located between said first portion and said second portion for offsetting said frame member from said wall, said offsetting portion including a portion extending transversely to said first portion and a guiding portion for abutting the vertical side of said horizontal member.

2. A frame member bracket as set forth in claim 1 wherein said staggered prongs all extend in a generally vertical direction.

3. A frame mounting bracket as set forth in claim 1 wherein said staggered prongs extend in both a vertical direction and a generally horizontal direction.

4. A frame mounting bracket as set forth in claim 1 wherein said means on said first portion comprise a cutout in said first portion for receiving a fastener attached to said wall.

5. A frame mounting bracket as set forth in claim 6 wherein said cutoff is elongated horizontally, and a serrated upper border along said cutout.

6. A frame mounting bracket comprising a first portion, means on said first portion for attaching said bracket to a wall, a second portion connected to said first portion for underlying a horizontal edge of a horizontal member of a frame, a plurality of prongs extending upwardly from said second portion for penetrating upwardly into said horizontal member, an offsetting portion between said first and second portions for offsetting said frame member from said wall, and guiding means on said bracket for engaging said frame and orienting said second portion relative to said frame to guide said prongs into said horizontal member.

PO-1050
(5/69)

UNITED STATES PATENT OFFICE
CERTIFICATE OF CORRECTION

Patent No. 3,556,459  Dated January 19, 1971

Inventor(s) Donald V. Summerville, Jr.

It is certified that error appears in the above-identified patent and that said Letters Patent are hereby corrected as shown below:

Column 2, line 53, after "acts" insert --as--.

Column 4, line 48 (claim 5), change "6" to --4--.

Signed and sealed this 11th day of May 1971.

(SEAL)
Attest:

EDWARD M. FLETCHER, JR.  WILLIAM E. SCHUYLER, JR
Attesting Officer  Commissioner of Patents